(12) United States Patent
Neufeld et al.

(10) Patent No.: US 10,781,854 B2
(45) Date of Patent: Sep. 22, 2020

(54) LINEAR TRANSPORT SYSTEM

(71) Applicant: Beckhoff Automation GmbH, Verl (DE)

(72) Inventors: Joerg Neufeld, Paderborn (DE); Uwe Pruessmeier, Lemgo (DE)

(73) Assignee: Beckhoff Automation GmbH, Verl (DE)

( * ) Notice: Subject to any disclaimer, the term of this patent is extended or adjusted under 35 U.S.C. 154(b) by 0 days.

(21) Appl. No.: 16/520,790

(22) Filed: Jul. 24, 2019

(65) Prior Publication Data

US 2020/0003257 A1 Jan. 2, 2020

Related U.S. Application Data

(63) Continuation of application No. PCT/EP2018/056363, filed on Mar. 14, 2018.

(30) Foreign Application Priority Data

Apr. 21, 2017 (DE) .................. 10 2017 108 572

(51) Int. Cl.
*F16C 29/00* (2006.01)
*B61B 13/04* (2006.01)
(Continued)

(52) U.S. Cl.
CPC ............ *F16C 29/005* (2013.01); *B61B 13/04* (2013.01); *B61B 13/12* (2013.01); *B65G 17/12* (2013.01);
(Continued)

(58) Field of Classification Search
CPC .......... B65G 9/00; B65G 9/002; B65G 9/008; B65G 23/23; B65G 54/02; B65G 17/12;
(Continued)

(56) References Cited

U.S. PATENT DOCUMENTS 4,623,201 A * 11/1986 Gallone ................ F16C 29/045
384/53
4,867,579 A * 9/1989 Gallone ................ F16C 29/045
384/53
(Continued)

FOREIGN PATENT DOCUMENTS

DE 102013216958 A1 2/2015
EP 0577995 A2 1/1994
(Continued)

*Primary Examiner* — James R Bidwell
(74) *Attorney, Agent, or Firm* — Dorsey & Whitney LLP

(57) ABSTRACT

A linear transport system for conveying an object, wherein the linear transport system comprises at least one stationary guide rail and at least one movable conveying device, wherein the conveying device comprises a first guide unit having a first track roller, a second track roller and a first turntable, wherein the first track roller and the second track roller are mounted in a rotatable manner at the first turntable and lie against the guide rail, wherein the guide rail comprises a longitudinal rail axis extending in the longitudinal direction, wherein the first turntable is mounted about a turntable axis in a rotatable manner, wherein the turntable axis is arranged in an inclined manner, in particular perpendicular, to the longitudinal rail axis.

18 Claims, 13 Drawing Sheets

(51) Int. Cl.
*B61B 13/12* (2006.01)
*B65G 17/12* (2006.01)
*B65G 17/38* (2006.01)
*B65G 54/02* (2006.01)
*F16C 29/04* (2006.01)

(52) U.S. Cl.
CPC ............. *B65G 17/38* (2013.01); *B65G 54/02* (2013.01); *F16C 29/045* (2013.01)

(58) Field of Classification Search
CPC ......... B65G 17/38; B65G 17/20; E01B 25/22; E01B 25/24; B61B 13/04; B61B 13/12; F16C 29/005; F16C 29/045
USPC .................... 198/678.1, 465.4; 104/106, 111
See application file for complete search history.

(56) References Cited

U.S. PATENT DOCUMENTS

| | | |
|---|---|---|
| 4,884,898 A | 12/1989 | Magnuson |
| 5,018,928 A | 5/1991 | Hartlepp |
| 5,211,279 A * | 5/1993 | Abbestam ............. B23Q 1/262 198/748 |
| 5,915,840 A | 6/1999 | Daubert et al. |
| 6,766,897 B2 * | 7/2004 | Kuwabara ............. F16C 29/065 198/468.9 |
| 8,132,330 B2 | 3/2012 | Schroeder |
| 2009/0095192 A1 | 4/2009 | Roop |
| 2014/0291124 A1 * | 10/2014 | Fenile .................... B65G 47/82 198/617 |
| 2015/0027338 A1 * | 1/2015 | Aumann ................. B60L 13/03 104/290 |
| 2016/0031648 A1 | 2/2016 | Prüssmeier et al. |
| 2016/0046444 A1 * | 2/2016 | Fenile .................... B65G 39/18 198/687.1 |
| 2016/0229645 A1 * | 8/2016 | Von Ehrenstein ..... B65G 54/02 |

FOREIGN PATENT DOCUMENTS

| | | |
|---|---|---|
| EP | 0636561 A1 | 2/1995 |
| EP | 2460445 A1 | 6/2012 |
| EP | 2560904 A1 | 2/2013 |
| WO | 9813283 A1 | 4/1998 |

\* cited by examiner

LINEAR TRANSPORT SYSTEM

CROSS-REFERENCE TO RELATED APPLICATION

This application is a continuation of PCT Patent Application No. PCT/EP2018/056363, filed 14 Mar. 2018, and German Patent Application No. 10 2017 108 572.6, filed 21 Apr. 2017, entitled LINEAR TRANSPORT SYSTEM, each of which is hereby incorporated by reference in their entirety and for all purposes.

FIELD

The present invention relates to a linear transport system.

BACKGROUND

Documents EP 0 636 561 A1, EP 2 460 445 A1, U.S. Pat. No. 5,018,928 A, DE 10 2013 216 958 A1, U.S. Pat. No. 8,132,330 B2, US 2009/0095192 A1, U.S. Pat. Nos. 5,915,840, 4,884,898 and EP 0 577 995 A2 disclose varying designs of transport devices.

Furthermore, EP 2 560 904 B1 discloses a transport device for conveying a product, the transport device comprising a plurality of conveying elements for conveying products that may be moved independently from one another, a stationary guide rail arranged in a circumferential manner, the guide rail defining a running path with at least one track for the conveying element and comprising a linear-motor-driving device for driving the conveying elements, wherein each conveying element comprises permanent magnets interacting with coils of the linear-driving device and wherein each conveying element comprises at least a first partial element and a second partial element which are connected in an articulated manner by joints. Each conveying element has a modular design and the individual partial elements have the same basic design. A joint axis of each joint is arranged in parallel to the track.

SUMMARY

The present invention provides an improved linear transport system.

EXAMPLES

According to a first aspect, a linear transport system comprises at least one stationary guide rail and at least one movable conveying device, wherein the conveying device comprises a first guide unit having a first track roller, a second track roller and a first turntable, wherein the first track roller and the second track roller are mounted at the first turntable in a rotatable manner and lie against the guide rail, wherein the guide rail comprises a longitudinal rail axis extending in the longitudinal direction, wherein the first turntable is mounted on a turntable axis in a rotatable manner, wherein the turntable axis is arranged in an inclined manner to the longitudinal rail axis, wherein the first guide unit comprises a second turntable, a third track roller and a fourth track roller, wherein the third track roller and a fourth track roller are mounted at the second turntable in a rotatable manner and lie against the guide rail, wherein the guide rail is arranged between the first turntable and the second turntable, wherein the second turntable is arranged opposite to the first turntable and mounted on a further turntable axis in a rotatable manner, wherein the track rollers rest against both side of the guide rail, wherein the further turntable axis is arranged in an inclined manner, preferably perpendicular, to the longitudinal rail axis.

According to a second aspect, a guide rail for a linear transport system, comprises a first rail-running surface, a second rail-running surface, a third rail-running surface and a fourth rail-running surface, wherein the first rail-running surface is arranged in an inclined manner with regard to the second rail-running surface, wherein the first rail-running surface and the second rail-running surface face away from each other, wherein the third rail-running surface is arranged in an inclined manner to the fourth rail-running surface, wherein the third rail-running surface and the fourth rail-running surface face away from each other, wherein the third rail-running surface is arranged on a side of the runner rail opposite to the first rail-running surface, wherein the fourth rail-running surface is arranged on a side opposite to the second rail-running surface.

According to a third aspect, a conveying device comprises a first guide unit having a first track roller, a second track roller and a first turntable, wherein the first track roller and the second track roller are mounted at the first turntable in a rotatable manner and are designed to lie against a guide rail of the linear transport system, wherein the first turntable is mounted on a turntable axis in a rotatable manner, wherein the first guide unit comprises a second turntable, a third track roller and a fourth track roller, wherein the third track roller and a fourth track roller are mounted at the second turntable in a rotatable manner and are designed to lie against the guide rail, wherein the first turntable and the second turntable limit a space for arranging the guide rail between the first turntable and the second turntable, wherein the second turntable is arranged opposite to the first turntable and mounted on a further turntable axis in a rotatable manner, wherein the track rollers are designed to rest against both side of the guide rail, wherein the further turntable axis is arranged in parallel manner to the turntable axis.

An linear transport system for conveying an object may be provided by a linear transport system comprising at least one stationary guide rail and at least one movable conveying device, wherein the conveying device comprises a first guide unit having a first track roller, a second track roller and a first turntable, wherein the first track roller and the second track roller are mounted at the first turntable in a rotatable manner and abut on the guide rail, wherein the guide rail comprises a longitudinal rail axis extending in a longitudinal direction, wherein the first turntable is mounted on a turntable axis in a rotatable manner, wherein the turntable axis is inclined, in particular perpendicular, with regard to the longitudinal rail axis.

This arrangement has the advantage that a reliable guiding of the conveying device is provided even for narrow curve radii at the guide rail. Moreover, canting of the guiding device at the guide rail is prevented.

In a further embodiment, the first guide unit comprises a second turntable, a third track roller and a fourth track roller, wherein the third track roller and the fourth track roller are mounted in a rotatable manner at the second turntable and abut on the guide rail, wherein the guide rail is arranged between the first turntable and the second turntable, wherein the second turntable is arranged opposite to the first turntable and furthermore mounted on a further turntable axis in a rotatable manner, wherein the track rollers prop up on both sides of the guide rail, wherein the further turntable axis is inclined, preferably vertically, to the longitudinal rail axis, wherein the turntable axis and the further turntable axis are preferably aligned in parallel.

In a further embodiment, the first to fourth track roller are jointly arranged at the guide rail in an X shape.

In a further embodiment, the turntable axis is inclined with regard to the first rotational axis and/or the second rotational axis, wherein the turntable axis and the first rotational axis and/or the second rotational axis are arranged in a shared plane.

In a further embodiment, the first guide unit comprises a turntable-connecting section, wherein the turntable-connecting section is guided to bypass the guide rail and couples the first turntable to the second turntable in such a way that the turntable axis and the further turntable axis overlap, wherein the turntable-connecting section, the first turntable and the second turntable are preferably formed integrally and from one material. As a result, the conveying unit may carry particularly heavy loads.

In a further embodiment, the guide rail has a first rail-running surface, a second rail-running surface, a third rail-running surface and a fourth rail-running surface, wherein the first rail-running surface is arranged in an inclined manner with regard to the second rail-running surface, wherein the first rail-running surface and the second rail-running surface face away from each other, wherein the first track roller rolls off on the first rail-running surface and the second track roller rolls off on the second rail-running surface, wherein the third track roller rolls off on the third rail-running surface and the fourth track roller rolls off on the fourth rail-running surface, wherein the third rail-running surface is arranged inclined to the fourth rail-running surface, wherein the third rail-running surface and the fourth rail-running surface face away from each other, wherein the third rail-running surface is arranged on a side of the guide rail opposite to the first rail-running surface, wherein the fourth rail-running surface is arranged on a side opposite to the second rail-running surface. As a result, the guide rail may have a particularly compact design.

In another embodiment, the track rollers each have a circumferential running surface, wherein the track rollers each have a line of contact with the associated rail-running surface, wherein the rail-running surfaces are each arranged at the guide rails in such a way that the lines of contact each run at a lateral distance to a longitudinal rail axis of the guide rail, wherein the lines of contact are preferably jointly arranged in a plane, wherein the longitudinal rail axis is preferably perpendicular to the plane. As a result, a torque from the conveying device may be particularly well supported by the guide rail.

In another embodiment, the first rail-running surface and the second rail-running are arranged on a first side of the guide rail and the third rail-running surface and the fourth rail-running surface are arranged on a second side of the guide rail opposite to the first side, wherein the first rail-running surface and the fourth rail-running surface are aligned in parallel to each other and/or wherein the second rail-running surface and the third rail-running surface are aligned in parallel to each other. Said embodiment further has the advantage that the guide rail has a particularly high geometrical moment of inertia that is on the one hand not weakened by incisions in the guide rail and on the other hand in this embodiment allows for particularly high torques from the conveying device to be supported by the guide rail via the track rollers, thus rendering the linear transport system suitable for transporting particularly heavy loads even in an out-of-center arrangement at the conveying device.

In a further embodiment, the conveying device comprises a clamp, wherein the clamp is embodied to provide a clamping force. By the clamping force, the first track roller and the second track roller are pressed against the guide rail. This ensures that the conveying device runs in a manner free from backlash independently from the course of the guide rail, at the same time providing a balance of wear for wear of the track rollers.

In a further embodiment, the first turntable has a first turntable section, a second turntable section and a third turntable section. At the first turntable section, the first track roller is mounted on the first rotational axis in a rotational manner and at the second turntable section, the second track roller is mounted on the second rotational axis in a rotational manner. The third turntable section is arranged between the first turntable section and the second turntable section and connects the first turntable section to the second turntable section. The first turntable section and the second turntable section are arranged in an inclined manner with regard to each other and extend on a shared side of the third turntable section.

In a further embodiment, the turntable axis is arranged in an inclined manner to the first rotational axis and/or the second rotational axis, wherein the turntable axis and the first rotational axis and/or the second rotational axis are arranged in a shared plane.

In a further embodiment, the first guide unit comprises a second turntable with at least a third track roller and at least a fourth track roller, wherein the third track roller and the fourth track roller are mounted at the second turntable in a rotational manner. The second turntable is arranged opposite to the first turntable. As a result, a reliable guiding, in particular a tilting of the conveying unit around the longitudinal rail axis may be achieved.

In another embodiment, the first turntable and the second turntable are connected via a turntable-connecting section, wherein the turntable-connecting section, the first turntable and the second turntable are preferably formed integrally and from one material. As a result, particularly high forces from the conveying device may be supported even if the curve radii of the guide rail are very narrow.

In another embodiment, the first to fourth track rollers are jointly arranged in an X-arrangement with regard to the guide rail.

In another embodiment, the conveying device comprises a second guide unit and a coupling unit, wherein the first guide unit and the second guide unit are embodied identically, wherein the coupling unit mechanically couples the first guide unit with the second guide unit. As a result, a rotational movement of the conveying device on the transverse axis may reliably be prevented so that the conveying device is particularly stably guided by the guide rail.

In another embodiment, the linear transport system comprises a driving device wherein the driving device comprises a linear motor with a stator, a magnetic arrangement and a control device, wherein the stator comprises a plurality of separately energisable coils, wherein the magnetic arrangement is coupled to the first guide unit, wherein the coils are electrically coupled to the control device, wherein the control device is embodied to control a defined number of coils in such a way that the defined number of coils provides a magnetic travelling field for magnetically coupling the magnetic arrangement to the stator in order to move the conveying device. The coils are offset with regard to the guide rail and the magnetic arrangement is offset with regard to the turntable. The guide rail guides the conveying device in its movements.

BRIEF DESCRIPTION OF THE DRAWINGS

In the following, the present invention is explained in more detail in conjunction with the drawings, in which.

DETAILED DESCRIPTION

In the below-described figures reference is made to a coordinate system 5. The coordinate system 5 is depicted as a right-hand system and comprises an x axis, a y axis and a z axis. The coordinate system 5 may be embodied differently and serves to explain the figures in more detail.

Figure 1:
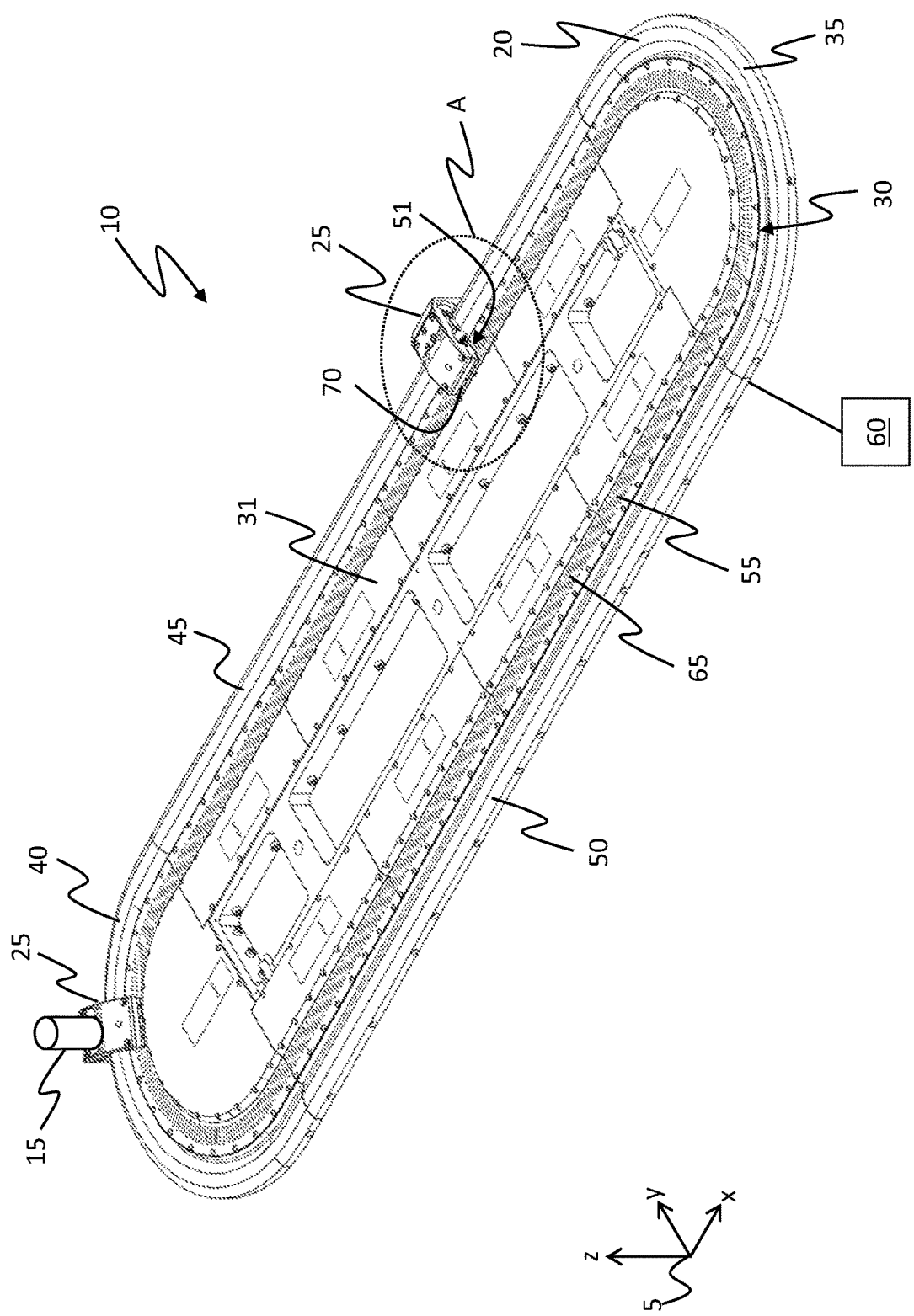
FIG. 1 shows a perspective view of a linear transport system according to a first embodiment.

FIG. 1 shows a perspective view of a linear transport system 10.

The linear transport system 10 comprises a stationary guide rail 20, at least one conveying device 25 and a driving device 30 having at least one drive module 31. In an embodiment, the linear transport system 10 comprises a plurality of identically formed conveying devices 25 and a plurality of drive modules 31, wherein the conveying devices 25 are e.g. arranged at a distance to each other at the guide rail 20. The number of conveying devices 25 and drive modules 25 may in this context be as desired. Each conveying device 25 may in this context be moved independently from the other conveying device 25. The conveying device 25 e.g. transports an object 15 between two stations.

In FIG. 1, the guide rail 20 comprises a first curve section 35, a second curve section 40, a first linear section 45 and a second linear section 50. The linear sections 45, 50 are arranged between the curve sections 35, 40 and connect the respective ends of the curve sections 35, 40.

The drive device 30 comprises a linear motor 51 with a stator 55, a magnetic arrangement 70 and a control device 60. The stator 55 comprises a plurality of separately energisable coils 65. In the embodiment, a plurality of coils 65 are arranged side-by-side in the drive module 31. The control device 60 is electrically connected to the stator 55. Each drive module 31 is connected to the guide rail 20. In this context, the coils 65 are arranged in a row extending in parallel to the guide rail 20.

The magnetic arrangement 70 is arranged at the conveying device 20. The magnetic arrangement 70 is respectively arranged laterally to the stator 55.

The control device 60 is configured to vary a coil current flow through a predefined number of coils 65. The coil current generates a magnetic travelling field that interacts with the magnetic arrangement 70.

The control device 60 is embodied to control the movement of the conveying device 25 along a guide rail 20. In this context, the control device 60 controls the coil currents in the coils 65 in such a way that a force is exerted onto the conveying device 20 along or, respectively, longitudinally to the drive module by the interaction of the magnetic arrangement 70 with the travelling field generated by the coil currents.

Figure 2:
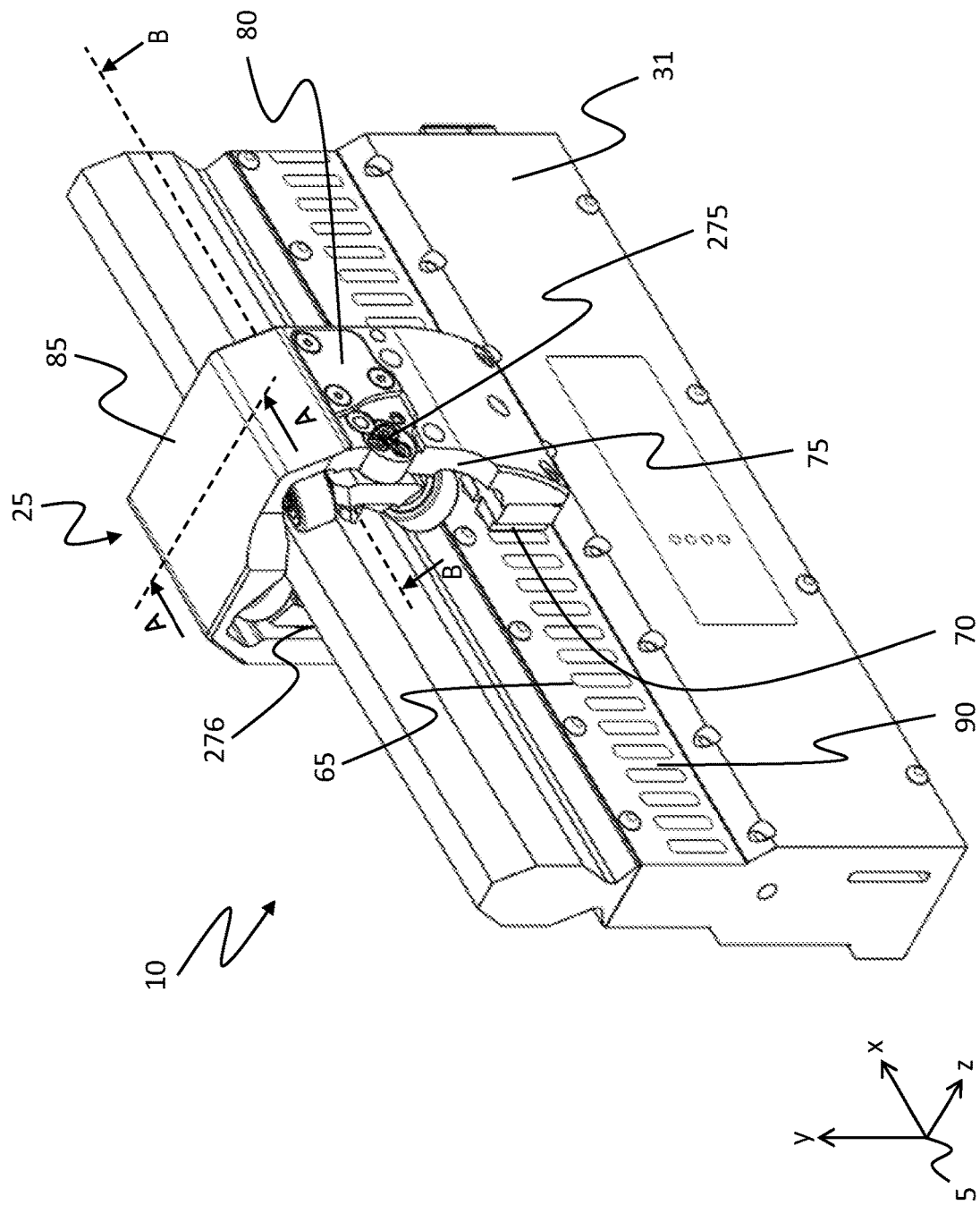
FIG. 2 depicts an enlarged section A of the linear transport system shown in FIG. 1.

FIG. 2 shows an enlarged section A of the linear transport system 10 shown in FIG. 1 in a position tilted towards the observer.

The conveying device 25 comprises a first guide unit 75, a second guide unit 80 and a coupling unit 85. Thereby, the first guide unit 75 is arranged at a distance in longitudinal direction to the second guide unit 80. The first guide unit 75 is mechanically coupled to the second guide unit 80 by the coupling unit 85. Moreover, the magnetic arrangement 70 is arranged laterally to the coils 65 at the coupling unit 85 at a transverse offset to the guide unit 75, 80. In this context, the magnetic arrangement 70 has a small distance to the stator side face 90 of the stator 55 in order to avoid a contact between the conveying device 25 and the stator side face 90 on the one hand and to minimize a gap in the magnetic flux between the permanent magnetic field and the travelling field on the other hand.

The coupling unit 85 is C-shaped or U-shaped. The coupling unit 85 grips the guide rail 20 in a circumferential manner and carries the magnetic arrangement 70 at the free end. In addition, a signal transmitter for a position-detection device may be arranged at the coupling unit 85.

The guide rail 20 is fixed to the drive module 31 in a transverse direction. Opposite to the guide rail 20, the drive module 31 is fixed to a machine base.

Figure 3:
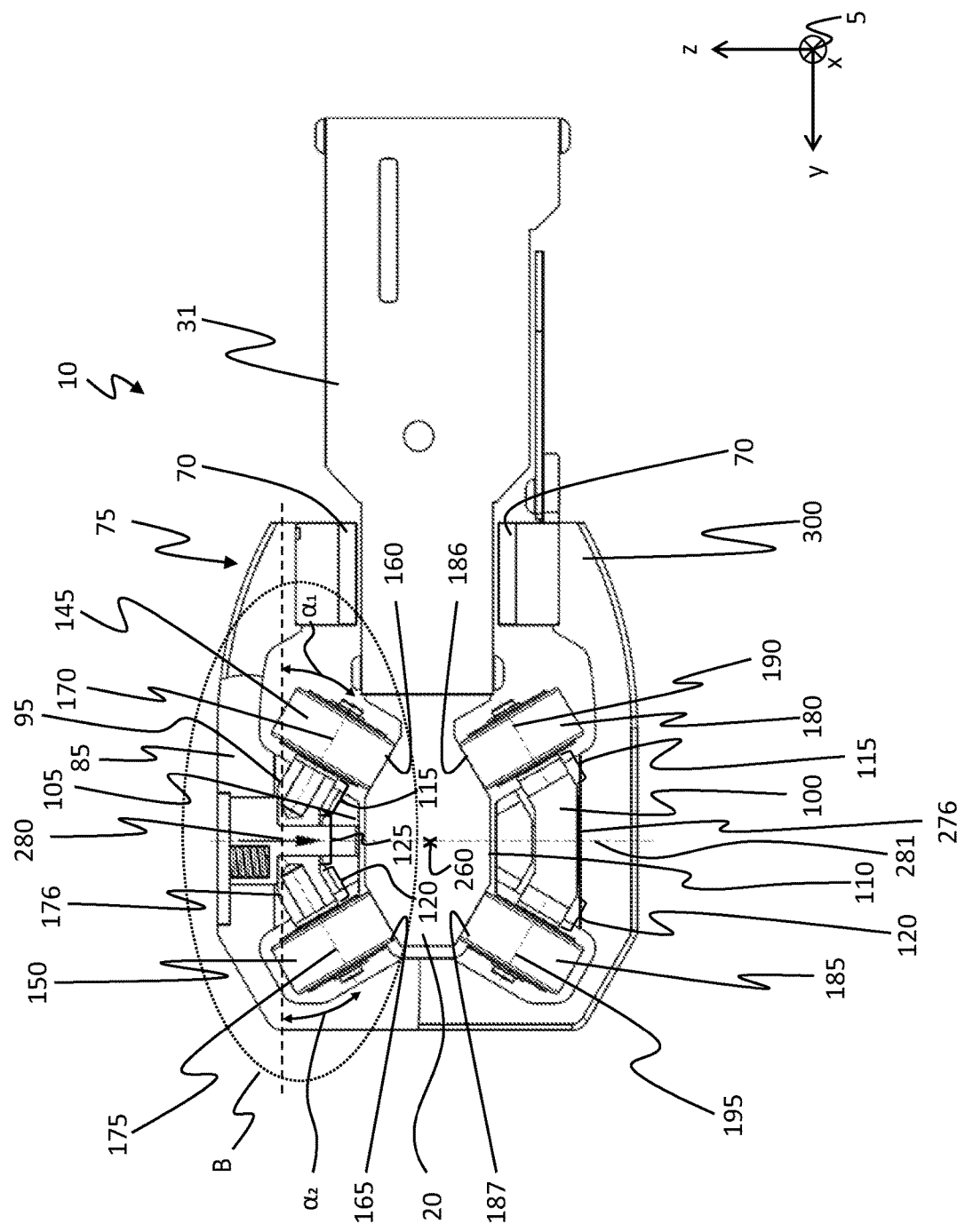
FIG. 3 depicts a sectional view along a sectional plane A-A through the linear transport system shown in FIG. 2.

FIG. 3 shows a sectional view along one of the sectional planes shown in FIG. 2 through the linear transport system 10 wherein for clarity's sake the sectional surfaces have not been depicted as hatched areas.

The first guide unit 75 comprises a first turntable 95 and a second turntable 100. The first turn table 95 is arranged above an upper side 105 of the guide rail 20. The second turntable 100 is arranged below a bottom side 110 of the guide rail 20.

The first turntable 95 has a fork-shape and comprises a first turntable section 115 and a second turntable section 120 that is offset in a transverse direction with regard to the first turntable section 115. A third turntable section 125 of the first turntable 95 is arranged in a transverse direction between the first turntable section 115 and the second turntable section 120. The third turntable section 125 is aligned in parallel with regard to the y axis. With regard to the third turntable section 125, the first turntable section 115 is tilted around the longitudinal axis by a first angle $\alpha_1$ in the direction of the guide rail 20. With regard to the third turntable section 125, the second turntable section 120 is tilted around the longitudinal axis by a second angle $\alpha_2$ in the direction of the guide rail 20. It is of particular advantage if the first angle $\alpha_1$ is identical to the second angle $\alpha_2$ and/or wherein the first angle $\alpha_1$ and/or the second angle $\alpha_2$ is an acute angle.

The first turntable section 115 and the second turntable section 120 are both located on a side of the third turntable section 125 facing the guide rail 20. The first guide unit 75 further comprises a first track roller 145 and a second track roller 150.

The first track roller 145 is mounted on a first rotational axis 170 at the first turntable section 115 in a rotational manner. The first track roller 145 has a first running surface 160 arranged circumferentially. The first running surface 160 is arranged on a circular track on the first rotational axis 170 and may be rounded.

The second track roller 150 is mounted on the second rotational axis 175 at the second turntable section 120 in a rotational manner. The first and second rotational axes 170, 175 are aligned flush with the first and second turntable sections 115, 120. The second track roller 150 has a second circumferential running surface 165. The second running surface 165 is arranged on a circular track on the rotational axis 175.

The first running surface 160 is arranged in an inclined manner at a first angle $\alpha_1$ with regard to the third turntable section 125. The second running surface 165 is arranged in an inclined manner at a second angle $\alpha_2$ with regard to the third turntable section 125.

The first turntable 95 is mounted at the coupling unit 85 in a rotatable manner on a first turntable axis 208. The first turntable axis 280 is perpendicular to the third turntable section 125 and extends in parallel to the z axis. The first turntable axis 280 is furthermore inclined, preferably perpendicular, with regard to the longitudinal rail axis 260 which in the shown embodiment extends along the x axis. In this context, it is particularly advantageous if an inclination of the first turntable axis 280 from the vertical line with regard to the longitudinal rail axis 260 is less than 10°.

The first turntable axis 280, the first rotational axis 170 and the second rotational axis 175 are arranged in a shared plane. The longitudinal rail axis 260 is perpendicular with regard to said plane.

The second turntable 100 is embodied identically to the first turntable 95, wherein the second turntable 100 is mounted at the coupling unit 85 in a rotational manner on a second turntable axis 281. For example, the first turntable axis 280 and the second turntable axis 281 overlap and e.g. extend in parallel to the z axis.

In addition to the first and second track roller 145, 150, the first guide unit 75 e.g. comprises a third track roller 180 and a fourth track roller 185. The third and fourth track roller 180, 185 are e.g. identical to the first and second track roller 145, 150. In this context, the third track roller 180 is mounted in a rotational manner on a third rotational axis 190 at the first turntable section 115 of the second turntable 100 and the fourth track roller 185 is mounted in a rotational manner on a fourth rotational axis 195 at the second turntable section 120 of the second turntable 100.

In the embodiment, the fourth rotational axis 195 is arranged in parallel to the first rotational axis 170 and the second rotational axis 175 is arranged in parallel to the third rotational axis 190. In this context, the third track roller 180 is arranged in a z-direction below the first track roller 145, and vertically below the second track roller 150 in a z-direction the fourth track roller 185 is arranged.

The third track roller 180 has a third circumferential running surface 186. The third running surface 186 is arranged on a circular track on the third rotational axis 190. The fourth track roller 180 has a fourth circumferential running surface 187. The fourth running surface 187 is arranged on a circular track on the fourth rotational axis 195.

Figure 4:
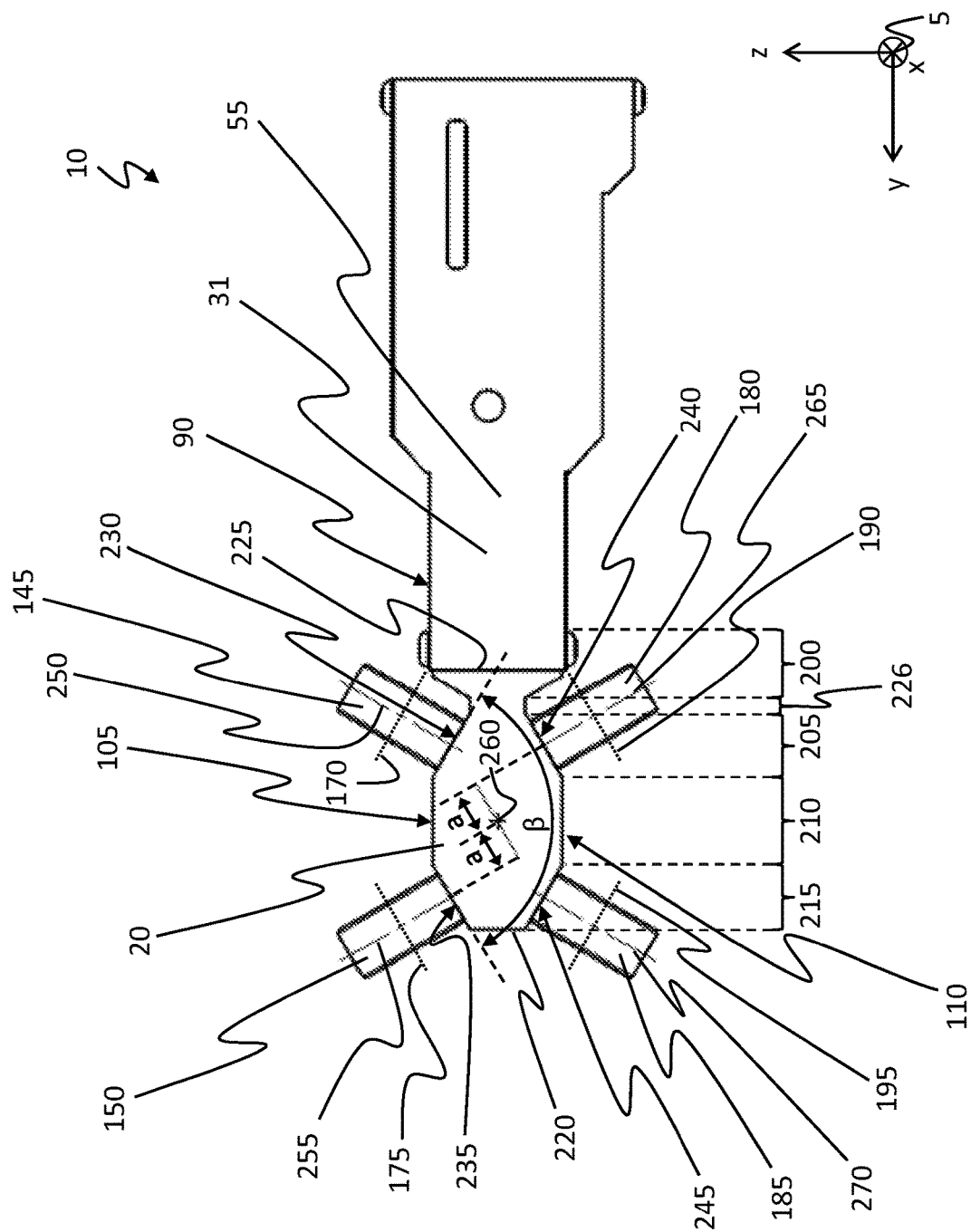
FIG. 4 shows a further sectional view along a sectional plane A-A shown in FIG. 2 through the linear transport system shown in FIG. 2.

FIG. 4 shows another sectional view along the sectional plane A-A shown in FIG. 2 through the linear transport system 10 of FIG. 2, wherein for clarity's sake the sectional surfaces have not been depicted as hatched areas. For simplification, only the track rollers 145, 150, 180, 185 of the conveying device 25 are shown.

The guide rail 20 comprises a fastening section 200, a first guide section 205, a connecting section 210 and a second guide section 215.

The second guide section 215 abuts on a free end 220 of the guide rail 20. The fastening section 200 is arranged adjacent to a fixed end 225 of the guide rail 20. By the fastening section 200, the guide rail 20 is connected to the drive module 31 of the linear transport system 10. The fastening section 200 tapers towards the free end 220 of the guide rail 20. In addition, a further connecting section 226 may be arranged between the fastening section 200 and the first guide section 205. The further connecting section 226 has a constant height. On a side facing away from the fastening section 200, the first guide section 205 abuts on the further connecting section 226. The first guide section 205 abuts on the connecting section 210 on a side facing away from the further connecting section 226.

In a z-direction, the connecting section 210 has a constant height and its cross-section is rectangular. The connecting section 210 is thicker in the z-direction than the further connecting section 226. The connecting section 210 is arranged between the first guide section 205 and the second guide section 205 in the transverse direction. Moreover, the stator-side surface 90 and the connecting section 210 are arranged in parallel to each other.

On the upper side 105 of the guide rail 20, the first guide section 205 comprises a first rail-running surface 230. The first rail-running surface 230 is inclined with regard to the y-axis. Thereby, the first rail-running surface 230 is arranged in such a way that the first guide section 205 widens in a direction of the fastening 200 towards the connecting section 210.

The second guide section 215 tapers from the connecting section 210 towards the free end 220. At the free end 220, the second guide section has a butt shape. The second guide section 215 comprises a second rail-running surface 235 at the upper side 105. The second rail-running surface 235 is inclined with regard to the connecting section 210. The guide rail 20 comprises a third angle $\beta$ between the first rail-running surface 230 and the second rail-running surface 235. The third angle $\beta$ is an oblique angle.

Furthermore, the first guide section 205 comprises a third rail-running surface 240 arranged at the bottom side 110. The third rail-running surface 240 is arranged below the first rail-running surface 230 in a z-direction. The first rail-running surface 230 and the third rail-running surface 240 are inclined towards a direction facing the stator 55.

The second guide section 215 comprises a fourth rail-running surface 245 at its bottom side 110, arranged at the bottom side of the second rail-running surface 235 in a z-direction. The second rail-running surface 235 and the fourth rail-running surface 245 are inclined in a direction facing away from the first rail-running surface 230 and the third rail-running surface 240. The rail-running surfaces 230, 235, 240, 245 have an identical width.

In the embodiment, the first rail-running surface 230 and the fourth rail-running surface 245 are aligned in parallel to each other. Likewise, the second rail-running surface 235 and the fourth rail-running surface 245 are arranged in parallel to each other. As a result, the guide rail 20 has an essentially rhombic base shape that is flattened at the upper and bottom side due to the connecting section 205.

The first track roller 145 rests on the first rail-running surface 230, the second track roller 150 on the second rail-running surface 235, the third track roller 180 on the third rail-running surface 240 and the fourth track roller 185 on the fourth rail-running surface 245, in a circumferential direction, respectively.

The first track roller 145 rolls off on the first rail-running surface 230 along a first line of contact 250 extending vertically to the first rotational axis 170 in a rotational plane. In the same manner, the second to fourth track rollers 150, 180, 185 roll off on the respective rail-running surface 235, 240, 245 along a corresponding second to fourth line of contact 255, 265, 270, that each extend in a rotational plane perpendicular to the second to fourth rotational axis 175, 190, 195 of the corresponding second to fourth track roller 150, 180, 185. The lines of contact 250, 255, 265, 270 are arranged in a further shared plane. The plane in which the axes of rotation 170, 175, 190, 195 are arranged and the further plane may be identical. The further plane, too, may be aligned perpendicularly to the rail-center axis 260.

The first track roller 145 and the second track roller 150 are arranged as a V. Thereby, a V arrangement means that the first line of contact 250 and the second line of contact 255 run towards each other on a side of the first and second track roller 145, 150 facing the guide rail 20.

In the same manner, the third and fourth track rollers 180, 185 are rotatably mounted in a V arrangement. Moreover, the third line of contact 265 and the fourth line of contact 270 run towards each other on the side of the third and fourth track roller 180, 185 facing the guide rail 20. As a result, the track rollers 145, 150, 180, 185 are arranged in X shape. An X shape means in this context that the lines of contact 250, 255, 265, 270 run towards each other on the side facing the guide rail 20. Thereby, the lines of contact 250, 255, 265, 270 may intersect with the longitudinal rail axis 260 of the guide rail 20 or the lines of contact 250, 255, 265, 270 may, as shown in FIG. 4, pass the longitudinal rail axis 260 at a predefined minimum distance a in a laterally offset manner within the further plane.

In this context, it is particularly advantageous if the lines of contact 250, 255, 265, 270 all have the same predefined minimum distance a to the longitudinal rail axis 260 of the guide rail 20. This prevents tilting of the conveying device 25 in its movement along the guide rail 20 on the longitudinal rail axis 260.

Figure 5:
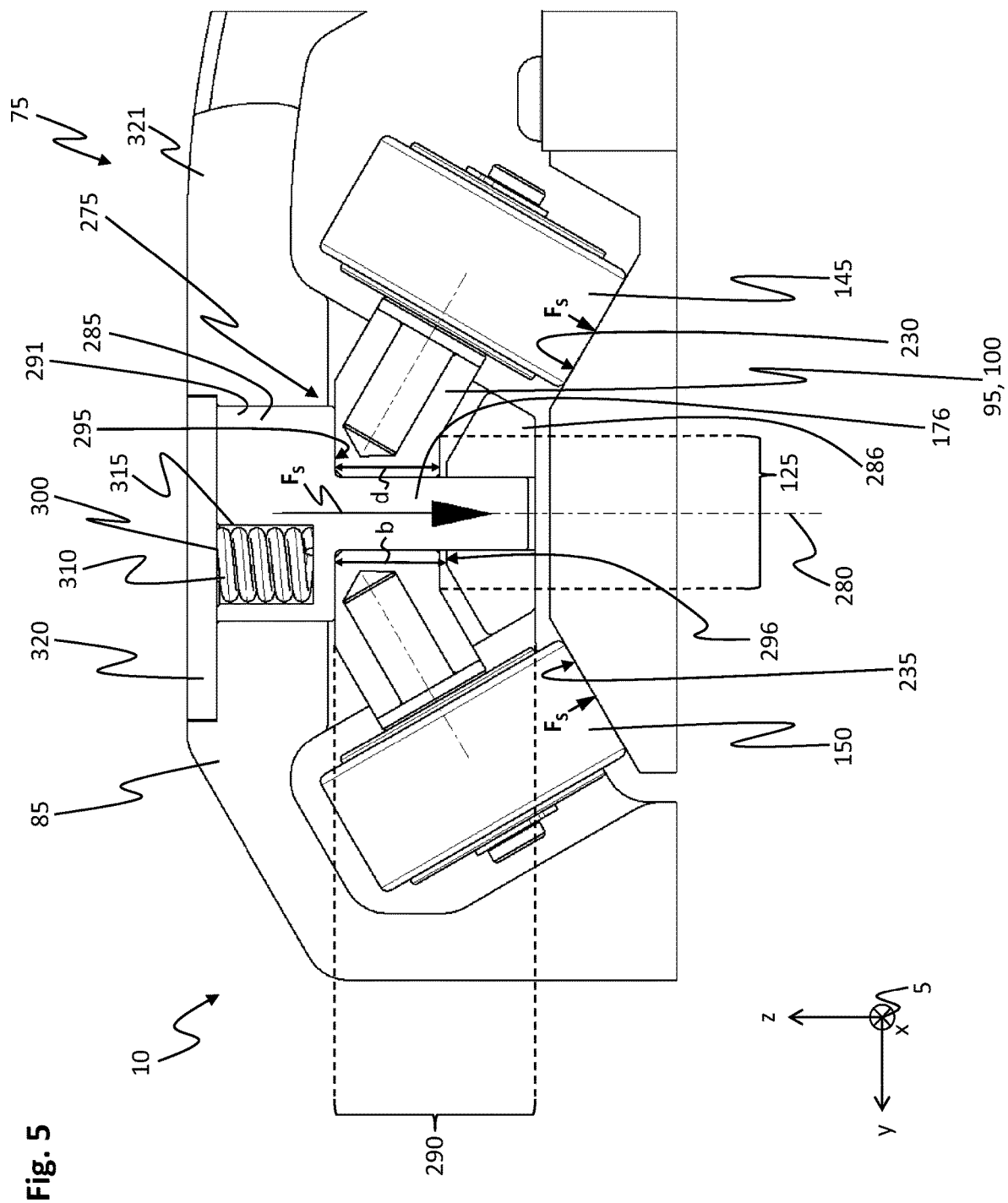
FIG. 5 shows an enlarged section B of the sectional view depicted in FIG. 3.

FIG. 5 shows an enlarged section B of the sectional view of FIG. 3, wherein for clarity's sake the sectional surfaces have not been depicted as hatched areas.

The first guide unit 75 comprises a first bearing device 275. The first bearing device 275 supports the first turntable 95 on the first turntable axis 280 that is preferably in parallel to the z-axis.

The first bearing device 275 comprises a bearing element 285 and a limiting element 286 beside a mounting 176 arranged in the third turntable section 125 of the first turntable 95. The mounting 176 extends in a z direction and is preferably arranged in the center of the third turntable section 125.

The bearing element 285 comprises a bolt section 290 and a step 291. The step 291 is connected to the bolt section 290. The bolt section 290 reaches through the mounting 176 and is formed corresponding to the mounting 176.

On a side facing the bolt section 290, the step 291 has a stop face 295. The stop face 295 is arranged in parallel to the third turntable section 125.

The bolt section 290 reaches through the limiting element 286. The limiting element 286 is arranged between the third turntable section 125 and the guide rail 20 and is rigidly connected to the bolt section 290 e.g. by a crimp connection. Moreover, the step 291 is connected to the carrier in a torque-proof manner.

On a side facing the bolt section 290, the limiting element 286 comprises a further stop 296. The further stop surface 296 is arranged in parallel to the third turntable section 125. It is e.g. of particular advantage if a distance b between the stop face 295 and the further stop face 296 is larger than a height d of the third turntable section 125.

At the stop face 295, the third turntable section 125 abuts on the upper side so that a position of the turntable 95, 100 is determined in its height in a first direction. On the bottom side, the position of the first turntable 95 relative to the coupling unit 85 is on the one hand limited by the first and second track rollers 145, 150 resting there and on the other hand by the third turntable section 125 striking against the further stop face.

In the embodiment, the first guide unit 75 comprises a second bearing device 275 beside the first bearing device 275 that is formed identically to the first bearing device 275 and which supports the second turntable 100 on the second turntable axis 281 in a rotational manner.

Due to the possibility of pivoting the turntable 95, 100 on the turntable axis 280, 281, it is made sure that particularly in curve section 35, 40 of the turntable 95, 100 is rotated on the turntable axis 280, 281 and canting of the guide unit 75, 80 at the guide rail 20 is prevented. Furthermore, a reliable contact of all track rollers 145, 150, 180, 185 even with narrow curve radii in the curve section 35, 40 is provided.

The first guide unit 75 comprises a clamp 300. The clamp 300 is arranged between the coupling unit 85 and the turntables 95, 100. The clamp 300 exemplarily comprises a clamping element 310 embodied as a pressure spring in the embodiment, and a clamping support 315. The clamping support 315 is embodied correspondingly to the clamping element 310 and in the embodiment arranged in step 291. The clamping support 315 is embodied as a blind hole and is sealed by a cap 320 of the coupling unit 85 on its upper side. The cap 320 is connected to a carrier 321 of the coupling unit 85, e.g. screwed onto it. The clamping element 310 is preferably arranged in a pre-tensioned manner in the clamping support 315 and provides the clamping force $F_S$. The clamping force $F_S$ is induced into the bearing element 285 via the base of the clamping support 315. The bearing element 285 transmits the clamping force $F_S$ via a contact of the stop face 295 with the third turntable section 125 into the turntable 95, 100 that transmits the clamping force $F_S$ to the first and second track rollers 145, 150. In this way, the first and second track rollers 145, 150 may be particularly well pressed to the first and second rail-running surfaces 230, 235.

On the backside, the clamping element 310 is supported by the cap 320. Due to the connection of the cap 320 with the carrier 321, the frictional connection to the first and second track roller 145, 150 is established by the carrier 321 being supported by the opposite side of the guide rail 20 above the second turntable 100 and the third and fourth track rollers 180, 185 on the opposite side of the guide rail 20 and as a result, the third and fourth track rollers 180, 185 being reliably pressed onto the third and fourth rail-running surface 240, 245. Thereby, on the one hand unevenness of the running surface 160, 165, 186, 187 and the rail-running surface 230, 235, 240, 235 may be absorbed, on the other hand, however, a simultaneous rolling contact of all track rollers 145, 150, 180, 185 at the guide rail 20 may be guaranteed even in the curve section 35, 40.

Moreover, wear of the track rollers 145, 150, 180, 185 may thereby be compensated and at the same time, zero backlash during roll-off of the track rollers 145, 150, 180, 185 on the guide rail 20 may be safeguarded in the curve section 35, 40 even with increasing wear of the track rollers 145, 150, 180, 185.

Due to the above-described embodiment of the linear transport system 10, in particular the curved section 35, 40 may have a particularly narrow curve radius.

In addition, the above-described embodiment safeguards that the first guide unit 75 exclusively comprises four track rollers 145, 150, 180, 185, making it particularly inexpensive in production.

In the embodiment, the turntables 95, 100 are each identically embodied and pre-tensioned via the clamp 300. Of course, it is also conceivable that only the clamp 300 is provided between the first turntable 95 and the coupling unit 85. The clamp 300 may also be omitted.

Figure 6:
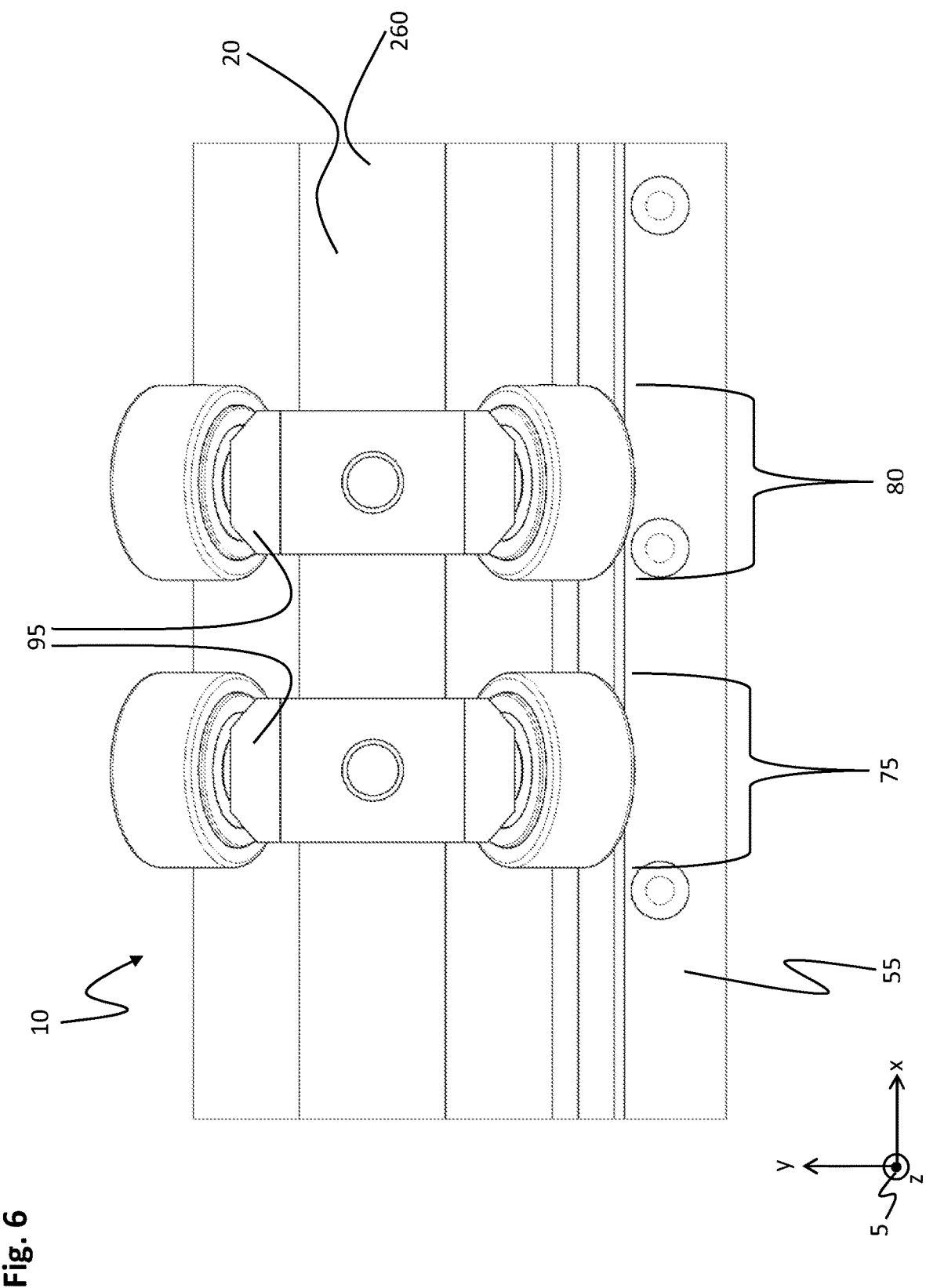
FIG. 6 depicts a sectional view along a sectional plane B-B shown in FIG. 2 through the linear transport system shown in FIG. 2.

FIG. 6 shows a sectional view along a sectional plane B-B shown in FIG. 2 through the linear transport system 10 depicted in FIG. 2, wherein for clarity's sake the sectional surfaces have not been depicted as hatched areas.

In a longitudinal direction, the second guide unit 80 is arranged in an offset manner to the first guide unit 75. The second guide unit 80 is configured identically to the first guide unit 75. The second guide unit 80 is connected to the first guide unit 75 via the coupling unit 85. In connection with the first guide unit 75, the second guide unit 80 ensures precise movement of the conveying device 25 along the guide rail 20 and prevents tilting of the conveying device 25 around the z axis.

Figure 7:
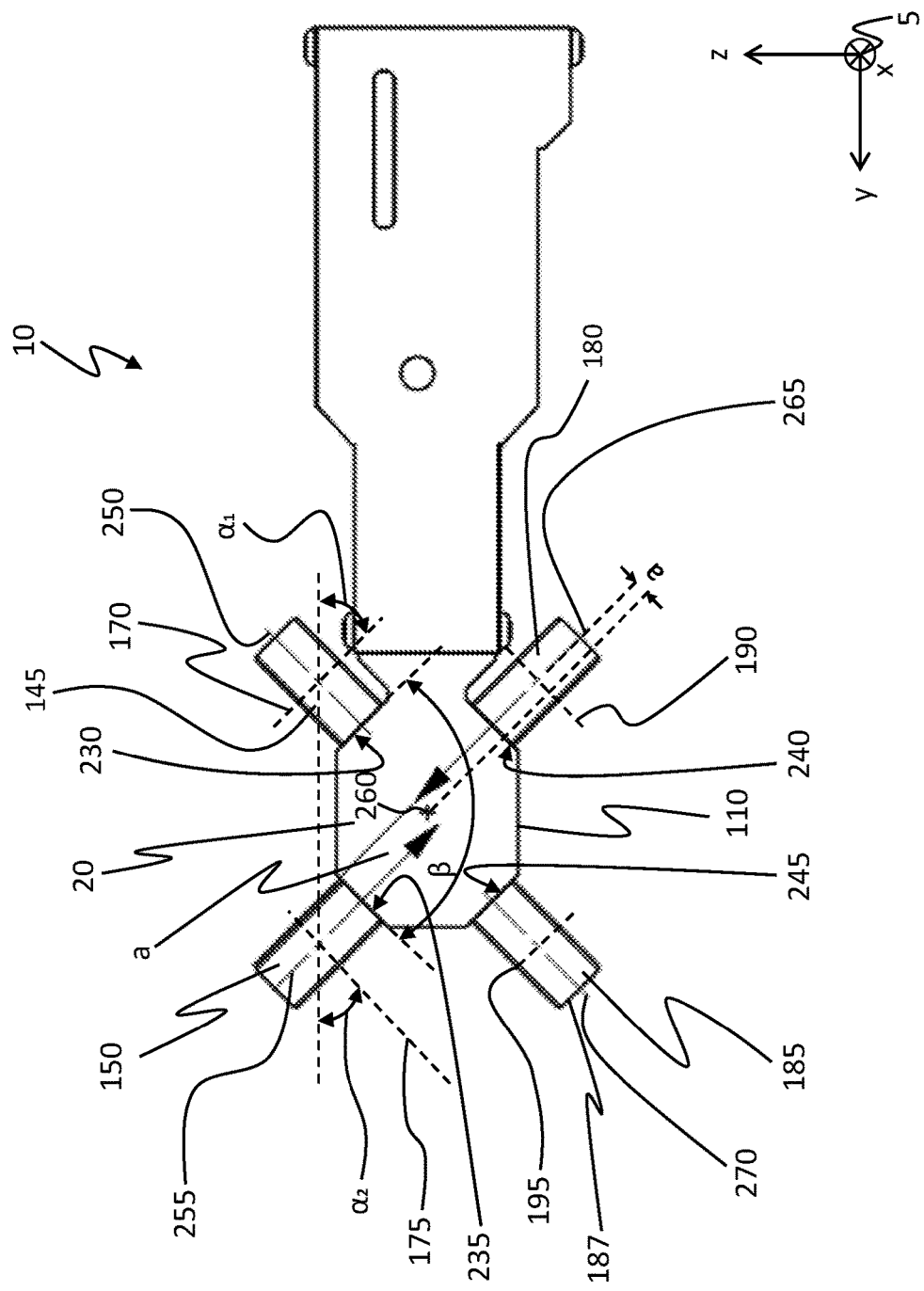
FIG. 7 shows a sectional view along the sectional plane A-A shown in FIG. 2 through a linear transport system according to a second embodiment.

FIG. 7 shows a sectional view along the sectional plane A-A depicted in FIG. 2 through a linear transport system 10 according to a second embodiment, wherein for clarity's sake the sectional surfaces have not been depicted as hatched areas. For a clearer illustration, only the track rollers 145, 150, 180 185 of the conveying device 25 are shown.

The linear transport system 10 is essentially identical to the linear transport system 10 shown in the embodiments of FIGS. 1 to 6. Other than in the embodiment of FIG. 4, the inclination of the rail-running surfaces 230, 235, 240, 245 with regard to each other is steeper.

Due to the steeper inclination, the third angle β between the first rail-running surface 230 and the second rail-running surface 235 is smaller than in the embodiment of the guide rail 20 shown in FIG. 4. Moreover, in FIG. 7 the first and second angle $\alpha_1$, $\alpha_2$ for the inclination of the rotational axes 170, 175, 190, 195 from the horizontal plane are larger than in FIG. 4.

As a result, the line of contact 250, 255, 265, 270 comprises a lower minimum distance a to the longitudinal rail axis 260 than in FIG. 4. Thus, compared to FIG. 4, only a smaller torque from the conveying device may be supported at the guide rail 20; this, however, provides a particularly compact embodiment of the guide rail 20 in a transverse direction. As a result, the linear transport system 10 may be embodied in a particularly compact manner.

Furthermore, a torsional rigidity of the guide rail 20 around the longitudinal rail axis 260 is reduced in comparison to the embodiment of FIG. 4 due to the steeper arrangement of the rail-running surfaces 230, 235, 240, 245. However, it is of advantage that the guide rail 20 is more compact in the y direction as it allows for a more compact embodiment of the conveying device.

Figure 8:
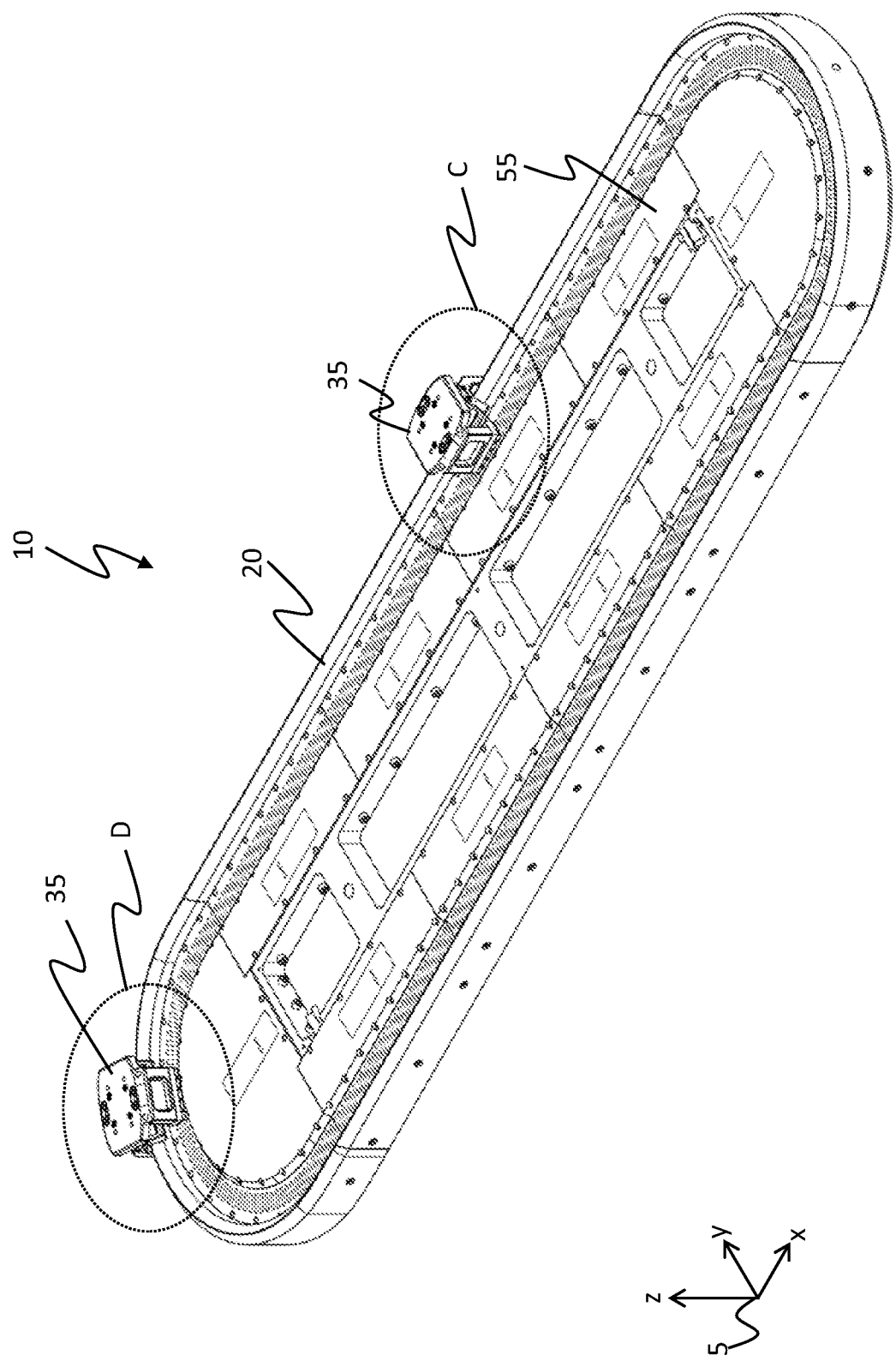
FIG. 8 shows a perspective view of a linear transport system according to a third embodiment.

FIG. 8 shows a perspective view of a linear transport system 10 according to a third embodiment.

The linear transport system 10 is essentially identical to the linear transport systems 10 depicted in FIGS. 1 to 7. The linear transport system 10 shown in FIG. 8 is particularly suitable for heavy loads, heavy objects that are, as the case may be, arranged laterally at the conveying device 25 due to the alignment of the guide rail 20 that is modified compared to that of FIGS. 1 to 7, as well as due to the modified construction of the conveying device 25.

Figure 9:
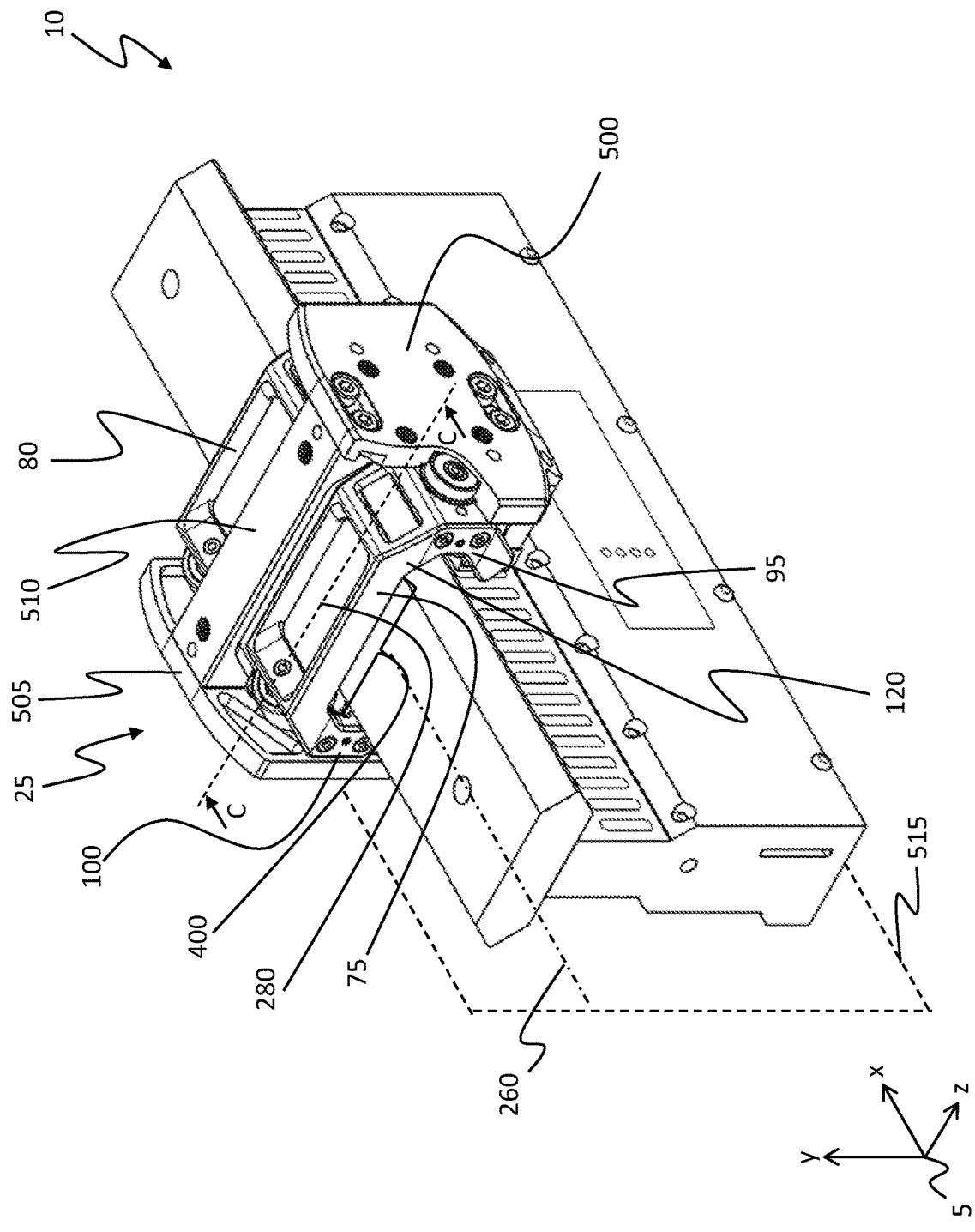
FIG. 9 depicts an enlarged section C of the linear transport system shown in FIG. 8.

FIG. 9 shows an enlarged section C of the linear transport system 10 shown in FIG. 8 in a position that is tilted towards the observer.

The first guide unit 75 comprises a turntable-connecting section 400 in addition to the first and second turntable 95, 100 that connects the first turntable 95 to the second turntable 100. The turntable-connecting section 400 extends in a transverse direction and connects the first turntable 95 to the second turntable 100. The turntable-connecting section 400 is arranged on an upper side of the guide rail 20.

In the embodiment, two guide units 75, 80 are respectively provided for the conveying device 25 in the longitudinal direction. In the embodiment, the second guide unit 80 is embodied identically to the first guide unit 75. The second guide unit 80 is offset with regard to the first guide unit 75 in a longitudinal direction, in an x direction.

The coupling unit 85 is formed essentially identically to the coupling unit shown in the preceding Figures. Differing therefrom, the coupling unit 85 has a multi-part embodiment and comprises a first carrier 500, a second carrier 505 and a connector 510.

The first carrier 500 and the second carrier 505 have a mirror-symmetric arrangement with regard to a symmetry plane 515. The symmetry plane 515 is embodied as a xy plane and the longitudinal rail axis 260 extends in the symmetry plane 515. The carriers 500, 505 are formed as plates and essentially aligned in parallel to the longitudinal rail axis 260. The guide units 75, 80, the stator 55 and the guide rail 20 are arranged between the first carrier 500 and the second carrier 505.

On a side facing away from the guide rail 20, the connector 510 connects the first carrier 500 to the second carrier 505. In the longitudinal direction, the connector 510 is arranged between the first guide unit 75 and the second guide unit 80. The connector 510 is considerably narrower in the longitudinal direction than the carrier 500, 505 so that the guide unit 75, 80 is open on the upper side. The connector 510 is aligned perpendicular to the guide rail 20 and screwed to the carrier 500, 505 by each of its ends.

Figure 10:
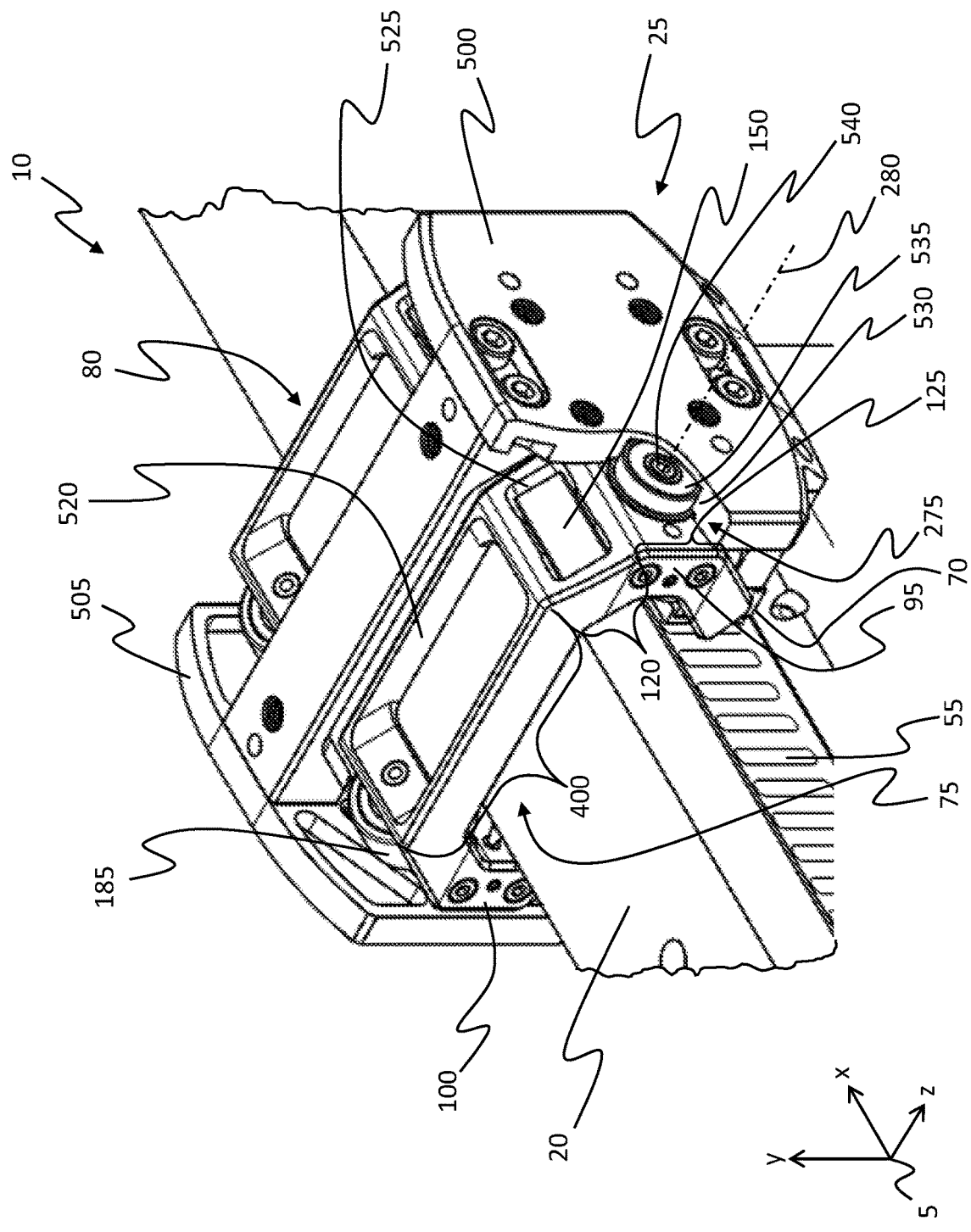
FIG. 10 again depicts an even more enlarged section C of the linear transport system shown in FIG. 8.

FIG. 10 shows an even more enlarged section C of the linear transport system 10 shown in FIG. 8.

A first recess 520 is arranged in the turntable-connecting section 400. The first recess 520 is embodied as a via opening and tapers from the outside towards the inside of the guide rail 20. The first recess 520 has a closed embodiment in the longitudinal direction. Thereby, a weight of the conveying device 25 may be kept low. Moreover, it is made sure that a fastening of the second and fourth track roller 150, 185 is rendered accessible.

In the second turntable section 120 of the first turntable 95, a second recess 525 is provided. The second recess is embodied as a via opening. In the longitudinal direction, the second recess 525 is closed. In the second recess 525, the second track roller 150 is arranged. Likewise, the second recess 525 may be provided for each of the other track rollers for receiving the track roller in the turntable 95, 100 in order to ensure a particularly compact embodiment of the guide unit 75, 80.

Moreover, the bearing device 275 is embodied differently than in FIG. 5. For each bearing device 275, a bearing support 530 is respectively provided in the carrier 500, 505. The bearing support 530 is formed in an open manner on a side of the carrier 500, 505 facing the turntable 95, 100. The bearing device 275 comprises a bearing bushing 535 and a bearing bolt 540 wherein the bearing bushing 535 is arranged in the bearing support 530 and connected to the carrier 500, 505 in a torque-proof manner. The bearing bolt 540 engages with the bearing bushing as well as with the third turntable section 125. The bearing bolt 540 is connected with the turntable 95, 100 in a torque-proof manner and mounts the first guide unit 75 in a rotatable manner on the turntable axis 280 in the bearing bushing 540.

On a side of the carrier 500, 505 facing the stator 55, the magnetic arrangement 70 is fastened to the bottom side.

Figure 11:
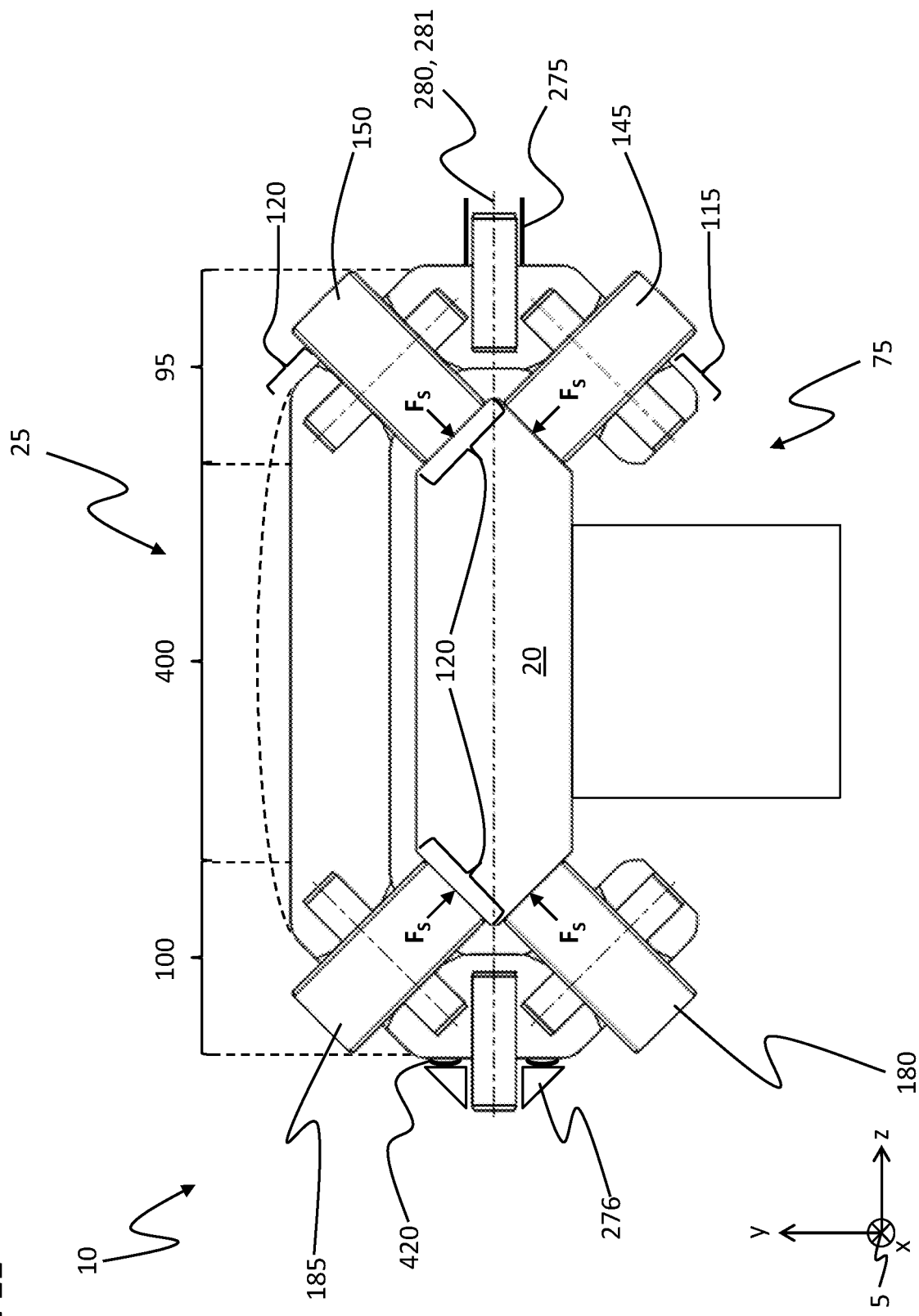
FIG. 11 shows a sectional view along the sectional plane C-C shown in FIG. 9 through the linear transport system depicted in FIG. 9.

FIG. 11 shows a sectional view along the sectional plane C-C shown in FIG. 9 through the linear transport system 10 depicted in FIG. 9 wherein for clarity's sake the sectional surfaces have not been depicted as hatched areas.

By coupling the first turntable 95 to the second turntable 100 by the turntable-connecting section 400 and due to the integral embodiment of the turntable 95, 100 from the same material as the turntable-connecting section 400, the first guide unit 75 has an essentially C-shaped embodiment. By coupling the two turntables 95, 100 by the turntable-connecting section 400, the turntable axes 280, 281 overlap so that the first and third track roller 145, 180 as well as the second and fourth track roller 150, 185 are guided in parallel.

In this context, it is particularly advantageous when the turntable-connecting section 400 takes over the function of the clamp that in an assembled state the turntable-connecting section 400 is bent with regard to its original alignment around the y axis. As a result, the turntable-connecting section 400 presses the track rollers 145, 150, 180, 185 to the guide rail 20 by clamping force $F_S$. Due to the pre-tension of the turntable-connecting section 400, a zero-backlash assembly of the conveying device 25 at the guide rail 20 is furthermore ensured in which at the same time wear of the track rollers 145, 150, 180, 185 and tolerances within the conveying device 25 may be compensated. As a result, the guide unit 75 may be provided with a particularly low number of components.

In the embodiment, the turntable-connecting section 400 respectively connects the second turntable sections 120 of the turntables 95, 100 to one another. It is particularly advantageous if the first bearing device 275 is formed as a fixed bearing in the z direction and the second bearing device 276 is formed as a loose bearing in the z direction. Thereby, tolerances between the first guide unit 75 and the coupling 85 may be compensated.

In addition to the first and/or second bearing device 275, 276, a pre-tensioning element 420 may be provided, the pre-tensioning element 420 e.g. comprising a disc spring or an elastomer, preferably a rubber disc. The pre-tensioning element 420 is e.g. arranged between the coupling unit 85 and the second turntable 100 and tensions the first and second bearing device 275, 276 with regard to the coupling unit 85. Due to the pre-tensioning element 420, the position in the transverse direction of the guide unit 75, 80 may reliably be determined in the coupling unit 85.

Figure 12:
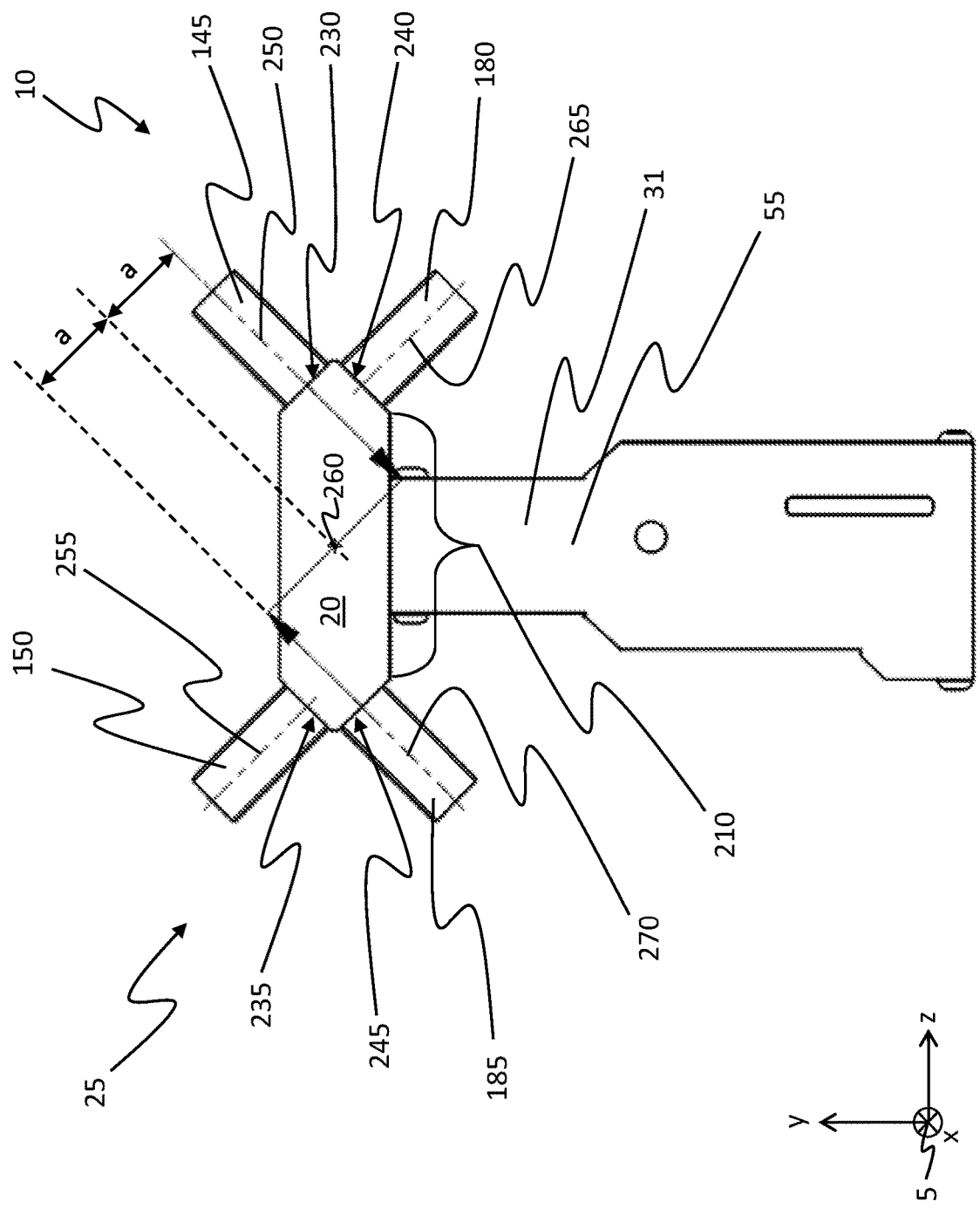
FIG. 12 is a sectional view along the sectional plane C-C shown in FIG. 9 through the linear transport system depicted in FIG. 9.

FIG. 12 depicts a cross-section along a sectional plane C-C shown in FIG. 9 through the linear transport system 10 depicted in FIG. 9, wherein for clarity's sake the sectional surfaces have not been depicted as hatched areas. For simplicity's sake, only the track rollers 145, 150, 180, 185 of the guide unit 25 are shown.

The guide rail 20 is essentially identical to the embodiment depicted in FIG. 4. The difference is that the fastening section of the guide rail of FIG. 4 has been omitted.

In this embodiment, the guide rail 20 is rotated by 90° compared to the embodiment shown in FIG. 4 so that the connecting section 210 is aligned vertically to the stator 55. The guide rail 20 is connected to the drive module 31 at the connecting section 210. Thereby, a bending moment in the guide rail 20 may be kept particularly low so that particularly heavy loads in the conveying device 25 may be supported at the guide rail 20. It is of particular advantage if the connecting section 210 is fastened to the center of the stator 55.

The connecting section 210 is wider than in FIG. 4. Moreover, the rail-running surfaces 230, 235, 240, 245 has a particularly steep arrangement with regard to the horizontal line or, respectively, the connecting section 210. As a result, the lines of contact 250, 255, 265, 270 have a particularly large minimum distance a to the longitudinal rail axis 260. As a result, a particularly high torque from the conveying device 25 may be supported at the guide rail 20.

Figure 13:
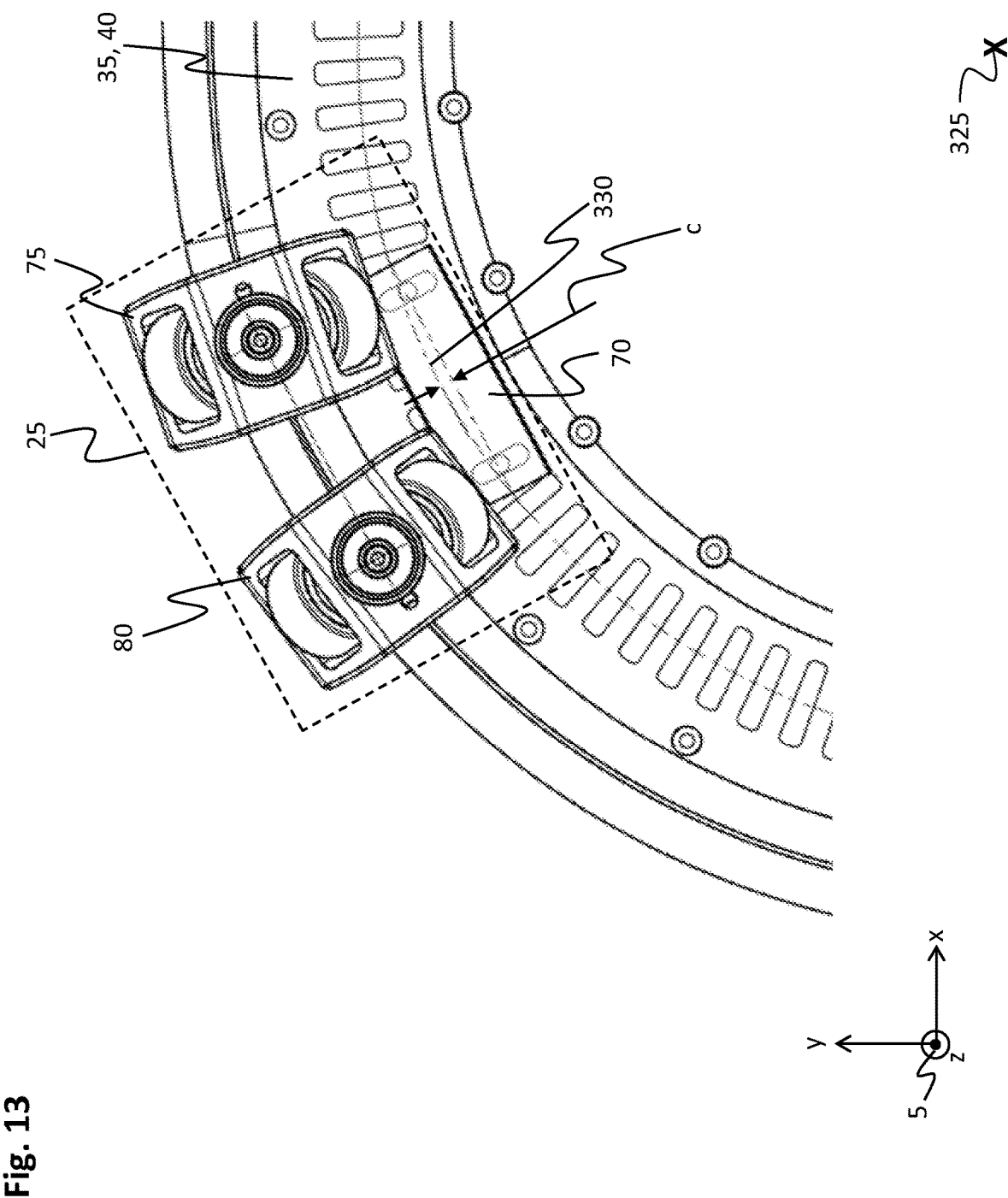
FIG. 13 shows an enlarged section D of the linear transport system shown in FIG. 8.

FIG. 13 shows an enlarged section D of the linear transport system 10 depicted in FIG. 8. In the curve section 35, 40, the magnetic arrangement 70 is inwardly displaced with regard to an ideal position of the magnetic arrangement 70 in which a maximum magnetic coupling occurs between the magnetic arrangement 70 and the travelling field, and radially referring to an arc center 325 of the curved section 35, 40. With increasing deviation c between the position of the magnetic arrangement 70 and the ideal position 330, a coupling of the travelling field with the magnetic arrangement 70 is reduced. In particular, the deviation c increases with a lower curve radius of the curve section 35, 40. In an embodiment, a compensation device may additionally be provided that moves the magnetic arrangement 70 in the curve section 35, 40 in the direction of an ideal position 330. Thereby, it is made sure that in the curve section 35, 40, too, the force from the travelling field of the stator 55 acting on the conveying device 25 is essentially constant. The compensation device may also be provided in a linear transport system 10 according to any one of FIGS. 1 to 8.

The embodiment of the linear transport system 10 of FIGS. 8 to 13 has the advantage that a high support stance may be provided between the track rollers 145, 150, 180, 185 and a particularly favorable mounting and support of forces from the conveying device 25 may be provided in the guide rail 20 due to the connection of the two turntables 95, 100 of each guide unit 75, 80 by the turntable-connecting device 400.

REFERENCE LIST 5 coordinate system
10 transport system
15 object
20 guide rail
25 conveying device
30 driving device
31 drive module
35 first curve section
40 second curve section
45 first linear section
50 second linear section 51 linear motor
55 stator
60 control device
65 coil
70 magnetic arrangement
75 first guide unit
80 second guide unit
85 coupling unit
90 stator side face
95 first turntable
100 second turntable
105 upper side of guide rail
110 bottom side of guide rail
115 first turntable section
120 second turntable section
125 third turntable section
145 first track roller
150 second track roller
160 first running surface
165 second running surface
170 first rotational axis
175 second rotational axis
176 mounting
180 third track roller
185 fourth track roller
186 third running surface
187 fourth running surface
190 third rotational axis
195 fourth rotational axis
200 fastening section
205 first guiding section
210 connecting section
215 second guiding section
220 free end of guide rail
225 fixed end
226 further connecting section
230 first rail-running surface
235 second rail-running surface
240 third rail-running surface
245 fourth rail-running surface
250 first line of contact
255 second line of contact
260 rail middle axis
265 third line of contact
270 fourth line of contact
275 first bearing device
276 second bearing device
280 first turntable axis
281 second turntable axis
285 bearing element
286 limiting element
290 bolt section
291 step
295 stop surface
296 further stop surface
300 clamp
310 clamping element
315 clamping support
320 cap
321 carrier
325 arc center
330 ideal position
400 turntable-connecting section
420 pre-tensioning element
500 first carrier
505 second carrier
510 connector
515 symmetry plane
520 first recess
525 second recess
530 bearing holder
535 bearing bushing

What is claimed is:

1. A linear transport system for conveying an object,
wherein the linear transport system comprises at least one stationary guide rail and at least one movable conveying device;
wherein the conveying device comprises a first guide unit having a first track roller, a second track roller and a first turntable;
wherein the first track roller and the second track roller are mounted at the first turntable in a rotatable manner and lie against the guide rail;
wherein the guide rail comprises a longitudinal rail axis extending in the longitudinal direction;
wherein the first turntable is mounted on a turntable axis in a rotatable manner;
wherein the turntable axis is arranged in an inclined manner to the longitudinal rail axis;
wherein the first guide unit comprises a second turntable, a third track roller and a fourth track roller;
wherein the third track roller and a fourth track roller are mounted at the second turntable in a rotatable manner and lie against the guide rail;
wherein the guide rail is arranged between the first turntable and the second turntable;
wherein the second turntable is arranged opposite to the first turntable and mounted on a further turntable axis in a rotatable manner;
wherein the track rollers rest against both side of the guide rail; and
wherein the further turntable axis is arranged in an inclined manner, preferably perpendicular, to the longitudinal rail axis.

2. The linear transport system according to claim 1, wherein the turntable axis and the further turntable axis are aligned in parallel to each other.

3. The linear transport system according to claim 1, wherein the first to fourth track roller are jointly arranged in an X arrangement at the guide rail.

4. The linear transport system according to claim 1,
wherein at the first turntable the first track roller is mounted on a first rotational axis in a rotational manner and the second track roller is mounted on the second rotational axis in a rotational manner;
wherein the turntable axis is arranged in an inclined manner to the first rotational axis and/or to the second rotational axis; and
wherein the turntable axis and the first rotational axis and/or the second rotational axis are arranged in a shared plane.

5. The linear transport system according to claim 1, wherein the first guide unit comprises a turntable-connecting section, wherein the turntable-connecting section is guided to bypass the guide rail and couples the first turntable to the second turntable in such a way that the turntable axis and the further turntable axis overlap.

6. The linear transport system according to claim 5, wherein the turntable-connecting section, the first turntable and the second turntable are formed integrally and from the same material.

7. The linear transport system according to claim 1,
wherein the guide rail comprises a first rail-running surface, a second rail-running surface, a third rail-running surface and a fourth rail-running surface;
wherein the first rail-running surface is arranged in an inclined manner with regard to the second rail-running surface;
wherein the first rail-running surface and the second rail-running surface face away from each other;
wherein the first track roller rolls off on the first rail-running surface and the second track roller rolls off on the second rail-running surface;
wherein the third track roller rolls off on the third rail-running surface and the fourth track roller rolls off on the fourth rail-running surface;
wherein the third rail-running surface is arranged in an inclined manner to the fourth rail-running surface;
wherein the third rail-running surface and the fourth rail-running surface face away from each other;
wherein the third rail-running surface is arranged on a side of the runner rail opposite to the first rail-running surface; and
wherein the fourth rail-running surface is arranged on a side opposite to the second rail-running surface.

8. The linear transport system according to claim 7,
wherein the track rollers each have a circumferential running surface;
wherein the track rollers each have a line of contact with the assigned rail-running surface; and
wherein each of the rail-running surfaces are arranged at the guide rail in such a way that the lines of contact run at a lateral distance to a longitudinal rail axis of the guide rail.

9. The linear transport system according to claim 8,
wherein the lines of contact are jointly arranged in a plane; and
wherein the longitudinal rail axis is arranged perpendicularly to the plane.

10. The linear transport system according to claim 7,
wherein the track rollers each have a circumferential running surface;
wherein the track rollers each have a line of contact with the assigned rail-running surface;
wherein the lines of contact are jointly arranged in a plane; and
wherein the longitudinal rail axis is arranged perpendicularly to the plane.

11. The linear transport system according to claim 7,
wherein the first rail-running surface and the second rail-running surface are arranged on a first side of the guide rail and the third rail-running surface and the fourth rail-running surface are arranged on a second side of the guide rail that is opposite to the first side; and
wherein the first rail-running surface and the fourth rail-running surface are aligned in parallel to each other.

12. The linear transport system according to claim 7, wherein the second rail-running surface and the third rail-running surface are aligned in parallel to each other.

13. The linear transport system according to claim 1,
wherein the conveying device comprises a clamp;
wherein the clamp is configured to provide a clamping force, and
wherein by the clamping force the first track roller and the second track roller are pressed to the runner rail.

14. The linear transport system according to claim 1,
wherein the first turntable comprises a first turntable section, a second turntable section and a third turntable section;
wherein at the first turntable section the first track roller is mounted on the first rotational axis in a rotatable manner and at the second turntable section the second track roller is mounted on the second rotational axis in a rotational manner;
wherein the third turntable section is arranged between the first turntable section and the second turntable section and connects the first turntable section to the second turntable section; and
wherein the first turntable section and the second turntable section are arranged in an inclined manner with regard to each other and extend on a shared side of the third turntable section.

15. The linear transport system according to claim 1,
wherein the conveying device comprises a second guide unit and a coupling unit;
wherein the first guide unit and the second guide unit are formed identically; and
wherein the coupling unit mechanically couples the first guide unit to the second guide unit.

16. The linear transport system according to claim 1, comprising a drive unit;
wherein the drive unit comprises a linear motor having a stator, a magnetic arrangement and a control device;
wherein the magnetic arrangement is coupled to the first guide unit;
wherein the stator comprises a plurality of energisable coils;
wherein the coils are electrically connected to the control device;
wherein the control device is formed to control a defined number of coils in such a way that the defined number of coils provide a magnetic travelling field for magnetically coupling the magnetic arrangement with the stator in order to move the conveying device; and
wherein the coils are offset with regard to the guide rail and the magnetic arrangement is preferably arranged with an offset with regard to the first turntable and the guide rail guides the conveying device in its movement.

17. A conveying device for a linear transport system,
wherein the conveying device comprises a first guide unit having a first track roller, a second track roller and a first turntable;
wherein the first track roller and the second track roller are mounted at the first turntable in a rotatable manner and are designed to lie against a guide rail of the linear transport system;
wherein the first turntable is mounted on a turntable axis in a rotatable manner;
wherein the first guide unit comprises a second turntable, a third track roller and a fourth track roller;
wherein the third track roller and a fourth track roller are mounted at the second turntable in a rotatable manner and are designed to lie against the guide rail;
wherein the first turntable and the second turntable limit a space for arranging the guide rail between the first turntable and the second turntable;
wherein the second turntable is arranged opposite to the first turntable and mounted on a further turntable axis in a rotatable manner;
wherein the track rollers are designed to rest against both side of the guide rail; and wherein the further turntable axis is arranged in parallel manner to the turntable axis.

18. The conveying device according to claim 17, wherein the first to fourth track roller are jointly arranged in an X arrangement at the guide rail.

\* \* \* \* \*